J. P. Clopton, Cotton Planter.

No. 116556

Patented Jul 4 1871

Witnesses
Wm. H. C. Smith
Alfred Lurcott

Inventor
J. P. Clopton
per Munn & Co
Attorneys 116,556

UNITED STATES PATENT OFFICE.

JAMES P. CLOPTON, OF TERRY, TENNESSEE.

IMPROVEMENT IN COTTON-PLANTERS.

Specification forming part of Letters Patent No. 116,556, dated July 4, 1871.

*To all whom it may concern:*

Be it known that I, JAMES P. CLOPTON, of Terry, in the county of Carroll and State of Tennessee, have invented a new and useful Improvement in Cotton-Planter; and I do hereby declare that the following is a full, clear, and exact description thereof, which will enable others skilled in the art to make and use the same, reference being had to the accompanying drawing forming part of this specification, in which—

Figure 1:
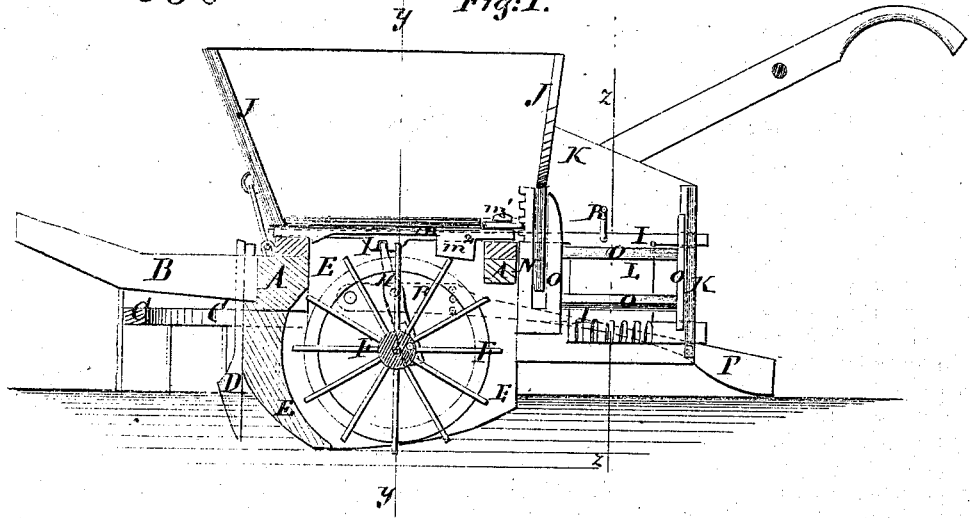
Figure 2:
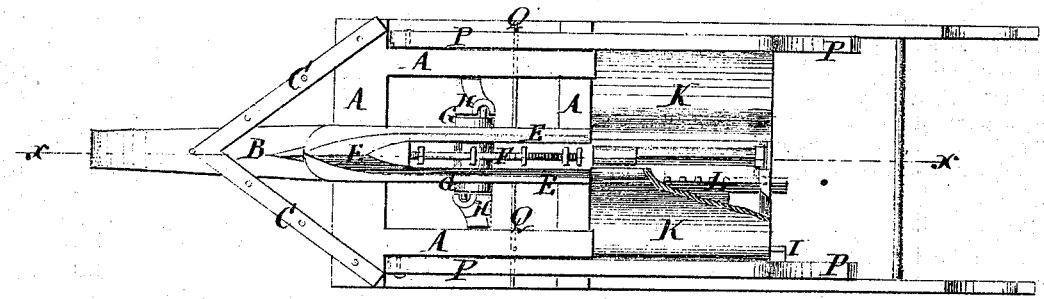
Figure 3:
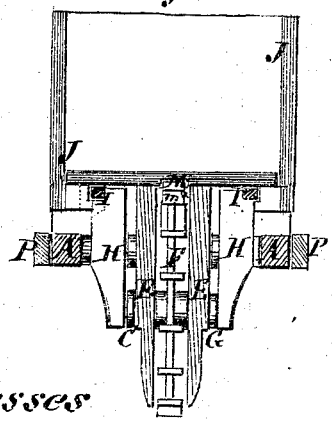
Figure 4:
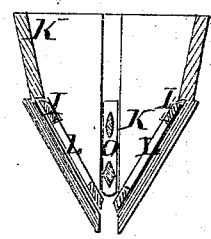

Figure 1 is a vertical longitudinal section of my improved planter taken through the line $x\,x$, Fig. 2. Fig. 2 is a bottom view of the same, part being broken away to show the construction. Fig. 3 is a vertical cross-section of the same taken through the line $y\,y$, Fig. 1. Fig. 4 is a vertical cross-section of the same taken through the line $z\,z$, Fig. 1.

Similar letters of reference indicate corresponding parts.

My invention relates to an improved cotton-planter; and consists in the combination of certain parts, which are hereinafter described, in connection with others necessary to form a complete operative machine.

A is the frame of the planter, to the middle part of the front cross-bar of which is attached the draft-bar B. To the draft-bar B, and to the front cross-bar of the frame A, is attached a small V-shaped harrow, C, to smooth off the top of the ridge in front of the furrowing and seed-dropping devices. D is the plow-tooth or cutter that opens the furrow to receive the seed, and the shank of which passes up through and is adjustably keyed to the rear part of the draft-bar B. E are two plates, which are attached to the frame A at such a distance apart as to receive the wheel F between them. The forward edges of the plates E meet, are inclined, and made somewhat V or boat-shaped, so as to press back the sides of the furrow and keep them from falling in before the seed has been deposited. The plates or shoe E may be made of wood or iron, and may be made solid in one piece, if desired. The lower part of the plates or shoe E is made open, as shown in Figs. 1, 2, and 3, to allow the rim of the wheel F to project sufficiently to take a firm hold upon the ground in the bottom of the furrow. The wheel F is made with paddle-like projections upon its rim, to enable it to take a firm hold upon the ground and prevent its slipping. The journals of the wheel F work in bearings in the plates or shoe E, and to their projecting ends are attached small crank-wheels G, the crank-pins of which enter and work in slots or grooves in the inner sides of the lower ends of the short levers H, which are pivoted to and between the plates or shoe E and the side bars of the frame A. The upper ends of the levers H enter notches in the under sides of the sliding bars I, so that the said bars may be moved back and forth by the advance of the machine. The bars I work in grooves or channels in the base-frame of the hopper or seed-reservoir J, which is detachably attached to the frame A, and which is designed to receive and carry a supply of seed for supplying the planting-hopper K, which is attached to the rear end of the reservoir J, and the bottom of which projects below the bottom of the said reservoir J, so as to reach nearly to the ground, to more surely introduce the seed into the furrow, and to enable the planting-hopper K to be conveniently supplied with seed from the reservoir J, even without stopping the machine. The lower part of the planting-hopper K is made V or wedge-shaped, and has a slot or opening in its angle or bottom for the escape of the seed. The rear ends of the sliding bars I project into and work in grooves or channels in the sides of the planting-hopper K. L are plates, the upper edges of which are attached to the sliding bars I, and which extend down along the inclined sides of the bottom of the planting-hopper K, to or nearly to the discharge-opening of said hopper. The inner sides of the lower parts of the plates L are corrugated or toothed, as shown in Figs. 1 and 2, so that the said plates, as they are moved back and forth, may work the cotton-seed down into and out through the discharge-opening of the hopper K. The lower parts of the plates L are kept in place upon the inclined sides of the bottom of the hopper K by bars or projections attached to or formed upon the lower parts of the said plates, and which work through holes in the front and rear ends of the said hopper K. M is a spring, the forward end of which is attached to the front cross-bar of the base-frame of the hopper J, and the rear end of which rests in a slot or notch in the rear cross-bar of said base-frame. The rear end of the spring M is detachably connected, by a button or other adjustable fastening, $m^1$, with the vertical bar N, which works in a groove in the end of the hopper J, and has notches formed in it to receive the fastening $m^1$ of the spring M. To the lower end of the vertical bar N is attached the lower part of the frame O, which works in grooves or slots in the front and rear ends of the hopper K. The frame O is designed to assist the seed in escaping through the discharge-opening in the bottom of the hopper K, the amount of seed distributed being regulated by raising or lowering the said frame O, by adjusting the fastening $m^1$ in a higher or lower notch of the bar N. Upon the lower side of the spring M is formed, or to it is attached, a projection, $m^2$, against which the projections of the rim of the wheel F strike and raise the spring M, which is brought down to its place by its elasticity, thus operating the frame O to push out the seed by the advance of the machine. To the upper part of the sliding plates L are attached one or more fingers, R, which project upward and inward, and are designed to agitate the seed and cause it to pass down freely to the lower part of the hopper K. P are spring-bars, to the rear ends of which the coverer is attached. The coverer is not shown in the drawing and may be of any desired form or size. The forward ends of the spring-bars P are pivoted to the outer sides of the forward parts of the side bars of the frame A. The spring-bars P are secured in position by rods or bolts Q which pass through holes in the said spring-bars P, and through holes in the side bars of the frame A, and which may be extended to enter holes in the plates or shoe E. Several holes are formed in the spring-bars P, or in the side bars of the frame A, for the reception of the rods or bolts Q, so that the said spring-bars may be raised or lowered, as may be required, to properly adjust the coverer so that it may cover the seed to any desired depth, the elasticity of the bars P holding the coverer down, and, at the same time, allowing it to yield, to pass over any obstruction it may encounter. The hoppers J K, and their attachments are detachably attached to the frame A, so that they may be conveniently detached and replaced by a device for planting corn, pease, and other smooth seeds.

Having thus described my invention, I claim as new and desire to secure by Letters Patent—

1. The combination of the wheel F, crank-wheels G, pivoted levers H, slide bars I, plates L, fingers R, frame O, and spring M, substantially as shown and described.

2. The arrangement of the supply-hopper or reservoir J and planting-hopper K with respect to each other and the frame A, substantially as herein shown and described, and for the purpose set forth.

JAMES P. CLOPTON.

Witnesses:
 WM. BLANKS,
 R. A. CLOPTON.